United States Patent
Bennington

(10) Patent No.: US 6,323,253 B1
(45) Date of Patent: Nov. 27, 2001

(54) FLAME-RETARDANT UV AND UV/MOISTURE CURABLE SILICONE COMPOSITIONS

(75) Inventor: Lester D. Bennington, East Hartford, CT (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/392,527

(22) Filed: Sep. 9, 1999

Related U.S. Application Data

(63) Continuation of application No. PCT/US99/11837, filed on May 28, 1999.
(60) Provisional application No. 60/087,449, filed on Jun. 1, 1998, and provisional application No. 60/119,953, filed on Feb. 15, 1999.

(51) Int. Cl.[7] .............. C08K 3/22; C08K 5/56; C08G 77/20; C08G 77/04; C08J 3/28
(52) U.S. Cl. ............... 522/16; 522/17; 522/18; 522/20; 522/29; 522/77; 522/83; 522/99; 524/437; 528/33
(58) Field of Search ............ 522/99, 39, 42, 522/46, 48, 64, 66, 71, 77, 83, 13, 16, 63, 43, 40, 41, 53; 524/437; 528/33

(56) References Cited

U.S. PATENT DOCUMENTS

| 4,201,808 | 5/1980 | Cully et al. ............... 428/40 |
|---|---|---|
| 4,293,397 | * 10/1981 | Sato et al. . |
| 4,348,454 | 9/1982 | Eckberg ............... 428/334 |
| 4,528,081 | 7/1985 | Lien et al. ............ 204/159.13 |
| 4,675,346 | 6/1987 | Lin et al. ............... 422/39 |
| 4,699,802 | 10/1987 | Nakos et al. ............ 427/54.1 |
| 5,179,134 | * 1/1993 | Chu et al. . |
| 5,212,211 | * 5/1993 | Welch, II et al. . |
| 5,302,627 | * 4/1994 | Field et al. . |
| 5,872,170 | * 2/1999 | Mine et al. . |

FOREIGN PATENT DOCUMENTS

| 1144237 | 3/1997 | (CN) ............ C08L/83/00 |
|---|---|---|
| 0 801 111 A1 | 4/1997 | (EP) ............ C08L/83/04 |
| 0 808 875 A1 | 5/1997 | (EP) ............ C08L/83/04 |
| 08 808 874 A1 | 5/1997 | (EP) ............ C08L/83/04 |
| 2 066 277 | * 7/1981 | (GB) . |
| 1 323 869 | 10/1970 | (GB) ............ C08G/47/02 |
| 2 039 287 A | 1/1980 | (GB) ............ C28G/77/04 |
| 10/30068 | 3/1998 | (JP) . |

\* cited by examiner

*Primary Examiner*—Susan W. Berman
(74) *Attorney, Agent, or Firm*—Steven C. Bauman

(57) ABSTRACT

The present invention is directed to silicone formulations which are capable of being rapidly cured to tough elastomeric materials through exposure to UV radiation, and optionally through exposure to moisture as well. The cured products demonstrate high resistance to flammability and combustibility. The flame-retardant components is a combination of hydrated alumina and an organo ligand complex of a transition metal or an organosiloxane ligand complex of a transition metal or a combination thereof.

20 Claims, No Drawings

FLAME-RETARDANT UV AND UV/MOISTURE CURABLE SILICONE COMPOSITIONS

This application claims benefit of Provisional Applications Ser. No. 60/087,489, filed Jun. 1, 1998, and Ser. No. 60/119953, filed Feb. 15, 1999, and a continuation of PCT/US99/11837, filed May 28, 1999.

BACKGROUND OF THE INVENTION

1. Field of the Invention

This application relates to UV and UV/moisture dual curable silicone compositions, which demonstrate high resistance to flammability and combustibility, and to silicone (polyorganosiloxane) rubber materials produced therefrom.

2. Brief Description of Related Technology

Silicone rubber and liquid compositions exist in various forms as characterized by their differing cure chemistry, viscosity, polymer type and purity. They can be formulated into one-part or two-part systems, and a particular silicone composition can be engineered to be curable by more than one mechanism.

Moisture-curing mechanisms, heat-curing mechanisms, and photo-initiated curing mechanisms are among the means used to initiate cure, i.e., cross-linking of reactive silicones. These mechanisms are based on either condensation reactions, whereby moisture hydrolyzes certain groups on the silicone backbone, or addition reactions that can be initiated by a form of energy, such as electromagnetic radiation or heat. In certain silicone compositions, a combination of such cure mechanisms may be used to achieve the desired results.

For example, reactive polyorganosiloxanes can be cured by heat in the presence of a peroxide. Alternatively, these reactive siloxanes can also be cured by heat in the presence of silicone hydride-containing (—SiH) compounds and a metallic hydrosilylation catalyst, such as an organo-platinum catalyst.

UV curing silicones having methacrylate functional groups are known. For instance, U.S. Pat. No. 4,675,346 (Lin), the disclosure of which is hereby expressly incorporated herein by reference, is directed to UV curable silicone compositions including at least 50% of a specific type of silicone resin, at least 10% of a fumed silica filler and a photoinitiator, and cured compositions thereof.

Other known UV curing silicone compositions include those disclosed in Great Britain Patent No. 1,323,869 [composition for plate-making in printing consisting of an organopolysiloxane containing a (meth)acrylate functional group, a photosensitizer, and a solvent, which cures to a hard film]; U.S. Pat. No. 4,201,808 (Culley) and U.S. Pat. No. 4,348,454 (Eckberg) (compositions of an organopolysiloxane having an average of at least one acryloxy and/or methacryloxy group per molecule; a low molecular weight polyacrylyl crosslinking agent; and a photosensitizer, reported as being suitable for release coatings and curable upon exposure to UV radiation); and Great Britain Patent No. 2,039,287 (composition for protective coatings on paper prepared from the reaction of methacryloxypropyltrimethoxysilane and low molecular weight hydroxyl-terminated polyorganosiloxanes).

UV/moisture dual curing silicone compositions are also known. See U.S. Pat. No. 4,528,081 (Nakos) and U.S. Pat. No. 4,699,802 (Nakos), the disclosures of each of which are hereby incorporated herein by reference.

In certain commercial applications of such silicone formulations, flammability and combustibility is a concern, particularly where it is an issue in production or with the end user. As a result, ordinarily only a subset of such silicone formulations have been used in such instances.

In the past, to alleviate the concern, heat-curable silicone compositions have been used where moldability of the composition itself and electrical properties of the cured product were desirable. Such heat-curable silicone compositions have been rendered resistant to flammability and combustion through the addition of halogenated materials, fillers, organo-platinum materials, and benzotriazoles.

However, the use of halogenated materials to achieve that property is undesirable because of toxicity and environmental concerns, as well as possibly contaminating the substrate on which the composition is placed.

Other ways of rendering such heat-curable silicone compositions resistant to ingnition are also known. For instance, European Patent Application Nos. 801 111, 808 874 and 808 875, each relate to liquid silicone rubber compositions which, after cure, are reported as producing a highly flame retardant silicone rubber. The compositions are polyorganosiloxane-based, and contain silica filler, aluminum hydroxide, benzotriazole, and a platinum-3,5-dimethyl-1-hexyn-3-ol reaction mixture. The compositions may further include zinc carbonate, polyorganohydrogensiloxane, and a hydrosilylation reaction catalyst.

In addition, a recently-published Chemical Abstracts citation to a Chinese patent document refers to a flame retardant silicone rubber for dielectric coatings of electric wire containing a vinyl-siloxane rubber, benzotriazole, chloroplatinic acid, a silica filler, and hydroxy silicone oil. See Chem. Abs. 128:168854s (1998)(citing Chinese Patent Document CN 1,144,237). Vinyl-siloxane rubbers are ordinarily curable by thermal mechanisms.

However, with certain commercial applications, heat-curable silicones present shortcomings. Those shortcomings include their limited usefulness with heat-sensitive substrates and/or heat-sensitive electronic circuitry. In addition, heat-curable silicones generally are slower to cure than silicones curable through other mechanisms, such as uv cure. Such a shortcoming is seen to be troublesome in the fabrication of devices, where the slower cure speed renders the fabrication process otherwise less efficient. Therefore, the applicability of such heat-curable silicones across a wide range of end-use applications appears to be limited.

Indeed, in those applications where a UV curable silicone composition would be desirable, one could not simply use the flame retardant materials as they have been used in the past with heat-curable silicones to impart such properties. That is, certain of these filler materials generally (and in the amounts called for by the EP '111, '874 and '875 publications) would render the compositions less transmissive to light (and oftentimes opaque). Compositions containing such fillers, thus, may not be cured properly by exposure to UV radiation. That is, at best a surface skin may form, but cure through volume likely will not occur due to interference by the filler.

Moreover, in practice, the compositions themselves would exhibit poor flow properties because of the amount of fillers used. And, when cured, the compositions may be brittle and therefore reduce the integrity of bonds formed therefrom.

And, a recently-published Chemical Abstracts citation to a Japanese patent document refers to UV-curable polysiloxane coating compositions reportedly having flame retardant capabilities. These silicone compositions contain a siloxane component, 2-hydroxy-2-methyl-1-phenylpropane and aluminum acetylacetonate. These compositions do not however appear to be filled, and they therefore may not possess the strength required of a cured material in a sealant or conformal coating application.

Accordingly, a need is seen for a UV curable silicone which is also resistant to flammability and combustibility.

Despite the existence of this need, it is not believed to date that UV curable filled silicone compositions have been made flame- and combustion-retardant.

Thus, notwithstanding the state-of-the-silicone technology with respect to flame and combustion retardancy, it would be desirable for a flame-retardant silicone compositions to be curable by exposure to UV radiation. It would also be desirable to provide such compositions with the ability to cure upon exposure to moisture, and to demonstrate commercially acceptable tack free time upon curing.

SUMMARY OF THE INVENTION

The present invention is directed to silicone formulations, which are capable of being rapidly cured to tough elastomeric materials through exposure to UV radiation and, optionally, exposure to moisture. The cured products demonstrate high resistance to flammability and combustibility.

More specifically, the compositions of the present invention include:

(a) a silicone resin component comprising a reactive polyorganosiloxane having at least one functional group selected from (meth)acrylate, carboxylate, maleate, cinnamate and combinations thereof, and optionally, an alkoxy or aryloxy functional group;

(b) optionally, an inorganic filler component;

(c) a photoinitiator component; and (d) a flame-retardant component in an amount effective to enhance the resistance of the composition to flammability.

The flame-retardant component may be selected from organometallic or silyl metallic materials, aluminas, precipitated silicas, and combinations thereof.

The inventive compositions may further include a triazole component and/or a reactive diluent component, examples of which are given below.

The present invention also provides methods of preparing the inventive compositions, methods of using such compositions, and reaction products of such compositions.

The present invention will be more readily appreciated by a reading of the section entitled "Detailed Description of the Invention" which follows below.

DETAILED DESCRIPTION OF THE INVENTION

The compositions of the present invention are silicone-based, functionalized with at least one group selected from (meth)acrylate, carboxylate, maleate, cinnamate and combinations thereof. These groups render the silicone material (s) susceptible to UV curing. In addition, in those instances where a secondary moisture cure is desirable, the polymerizable component also includes at least one alkoxy or aryloxy functional group.

As used herein, the term "(meth)acrylate" is intended to refer to groups of the structure

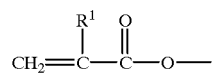

where $R^1$ is H or alkyl. Acrylate, methacrylate and ethacrylate groups are examples of such (meth)acrylate groups.

As used herein, the terms "alkoxy group" and "aryloxy group" are intended to refer to groups of the structure, $R^2$—O, where $R^2$ is alkyl or aryl, examples of which include methoxy, ethoxy and phenoxy.

Representative silicones include those found within formula:

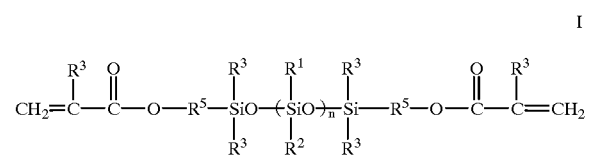

I where $R^1$, $R^2$ and $R^3$ may be the same or different and are organo groups including alkyls, such as methyl, ethyl and the like, halo alkyls such as 3,3,3-trifluoropropyl, substituted or unsubstituted aryls, such as benzyl or phenyl, alkoxy or substituted or unsubstituted aryloxy, such as methoxy, ethoxy and phenoxy, and others such as vinyl, methacryloxypropyl, mercaptopropyl, hydrogen or benzoin groups; $R^4$ is H or $C_{1-5}$ alkyl; $R^5$ is alkylene, such as $C_{1-8}$ alkylene; and n is at least 80.

Desirably, $R^1$ and $R^2$ are alkyl groups, such as methyl; $R^3$ is methyl; $R^4$ is methyl; and $R^5$ is propylene. In the case of a UV/moisture dual curable silicone, at least one $R^3$ is desirably methoxy.

The number of repeat units in the silicone of formula (I) should be at least about 80 in order to obtain the desired gel or elastomeric properties in the cured materials. Although n does not have a theoretical limit, it should not exceed 1500, as more than 1500 repeat units ordinarily yields a polymer which may be difficult to process, apply and cure.

Reactive silicones within formula (1) may be prepared from silanol-terminated silicones within formula (2).

An optional component in the inventive compositions is an inorganic filler component. When present, this component adds structural properties to the cured composition, as well as confers flowability properties to the composition in the uncured state. This component may often be reinforcing silicas, such as fumed silicas, and may be untreated (hydrophilic) or treated so as to render them hydrophobic. Virtually any reinforcing fumed silica may be used.

When present, the fumed silica should be used at a level of up to about 50 weight percent, with a range of about 4 to at least about 10 weight percent, being desirable. While the precise level of silica may vary depending on the characteristics of the particular silica and the desired properties of the composition and the reaction product thereof, care should be exercised by those persons of ordinary skill in the art to allow for an appropriate level of transmissivity of the inventive compositions to permit a UV cure to occur.

Desirable hydrophobic silicas include hexamethyldisilazane-treated silicas, such as those commercially available from Wacker-Chemie, Adrian, Michigan under the trade designation HDK-2000. Others include polydimethylsiloxane-treated silicas, such as those commercially available from Cabot Corporation under the trade designation CAB-O-SIL N70-TS, or Degussa Corporation under the trade designation AEROSIL R202. Still other silicas include trialkoxyalkyl silane-treated silicas, such as the trimethoxyoctyl silane-treated silica commercially available from Degussa under the trade designation. AEROSIL R805; and 3-dimethyl dichlorosilane-treated silicas commercially available from Degussa under the trade designation R972, R974 and R976.

The photoinitiator component may be any photoinitiator known in the art to cure acrylic functionalities, including benzoin and substituted benzoins (such as alkyl ester substituted benzoins), Michler's ketone, dialkoxyacetophenones, such as diethoxyacetophenone ("DEAP"), benzophenone and substituted benzophenones, acetophenone and substituted acetophenones, and xanthone and substituted xanthones. Desirable photoinitiators include diethoxyacetophenone, benzoin methyl ether, benzoin ethyl ether, benzoin isopropyl ether, diethoxyxanthone, chlorothio-xanthone, azo-bisisobutyronitrile, N-methyl diethanolaminebenzophenone, and mixtures thereof. Visible light initiators include camphoquinone peroxyester initiators and non-fluorene-carboxylic acid peroxyesters.

Commercially available examples of photoinitiators include those from Ciba Speciallty Chemicals Corp., Tarrytown, N.Y. under the IRGACURE and DAROCUR tradenames, specifically IRGACURE 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4-,4-trimethyl pentyl) phosphine oxide and 2-hydroxy-2-methyl-1-phenyl-propan-1-one), and 819 [bis(2,4,6-trimethyl benzoyl) phenyl phosphine oxide] and DAROCUR 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); and the visible light [blue] photoinitiators, dl-camphorquinone and IRGACURE 784DC (bis($\eta^5$-2,4-cyclopentadien-1-yl)-bis[2,6-difluoro-3-(1H-pyrrol-1-yl)phenyl]titanium).

Particularly desirable photoinitiators include DEAP. Generally, the amount of photoinitiator should be in the range of about 0.1% to about 10% by weight, such as about 2 to about 6% by weight.

The photoinitiator may also be polymer bound. Such photoinitiators are described in U.S. Pat. Nos. 4,477,326 and 4,587,276, the disclosures of each of which are hereby incorporated herein by reference. Other free radical initiators, such as peroxy initiators, may be used.

In those compositions in which moisture cure capabilities are also present, a moisture cure catalyst should also be included in an amount effective to cure the composition. For example, from about 0.1 to about 5% by weight, such as about 0.25 to about 2.5% by weight, of the moisture cure catalyst is desirable. Examples of such catalysts include organic compounds of titanium, tin, zirconium and of course combinations thereof. Tetraisopropoxytitanate and tetrabutoxytitanate are particularly desirable. See also U.S. Pat. No. 4,111,890, the disclosure of which is expressly incorporated herein by reference.

The flame-retardant component should be used in the composition in an amount effective to enhance the resistance of the composition to flammability and combustion.

Suitable components include complexes of various transition metals with organic ligands or siloxane ligands, provided the complex confers flame-retarding capabilities to the composition in which it is used. Appropriate transition metals include platinum, ruthenium, rhodium, palladium and the like. Virtually any organic ligand or siloxane ligand may be used to complex with the transition metal, provided it aids in retarding flammability and combustibility of the cured silicone-based resin and the resulting complex is compatible from a phase separation perspective with the remaining components in the composition.

Commercially available materials suitable for use as a flame-retardant component include platinum-siloxane complex commercially available from Bayer Corporation under the trade designation BAYSILONE U catalyst Pt/L (CAS 73018-55-0).

Such organometallic or silyl metallic components should be used in an amount within the range of 0.001 to about 1 weight percent, such as about 0.01 to about 0.2 weight percent, to achieve the desired affect.

Other components suitable for such use as the flame-retardant component include hydrated alumina, precipitated silicas (such as those available commercially under the AEROSIL tradename from Degussa Corporation), and combinations thereof.

Such other flame-retardant components may be used in an amount up to about 50 weight percent or more, with about 20 to about 50 weight percent being particularly desirable to achieve the desired affect.

A further component which may be included in the compositions of this invention is a triazole component. The triazole component aids the flame and combustion retarding properties of the inventive compositions. Suitable triazoles include benzotriazole, and other functionalized benzotriazoles capable of conferring flame retarding capabilities to the composition in which it is used.

The triazole component may be included in the inventive compositions of a level within the range of about 0.0005 to about 1 weight percent, such as about 0.5 weight percent.

Yet another component that may be included in the inventive compositions is a reactive diluent. When used, the reactive diluent is seen to improve the surface tack of silicone (polyorganosiloxane) rubber materials produced therefrom.

Examples of such reactive diluents include (meth) acrylate-terminated-dimethoxypropyldimethyl siloxane, and other well-known siloxane-based reactive diluents.

Other reactive diluents include (meth)acrylates, such as are represented by $H_2C=CGCO_2R^6$, where G may be hydrogen, halogen or alkyl of 1 to about 4 carbon atoms, and $R^6$ may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulonate, sulfone and the like.

More specific (meth)acrylates particularly desirable for use as a reactive diluent include polyethylene glycol di(meth)acrylates, bisphenol-A di(meth)acrylates, such as ethoxylated bisphenol-A (meth)acrylate ("EBIPA" or "EBIPMA"), and tetrahydrofuran (meth)acrylates and di(meth)acrylates, citronellyl acrylate and citronellyl methacrylate, hydroxypropyl (meth)acrylate, hexanediol di(meth)acrylate ("HDDA" or "HDDMA"), trimethylol propane tri(meth)acrylate, tetrahydrodicyclopentadienyl (meth) acrylate, ethoxylated trimethylol propane triacrylate ("ETTA"), triethylene glycol diacrylate and triethylene glycol dimethacrylate ("TRIEGMA"), isobornyl acrylate and isobornyl methacrylate, and an acrylate ester corresponding to structure III as shown below:

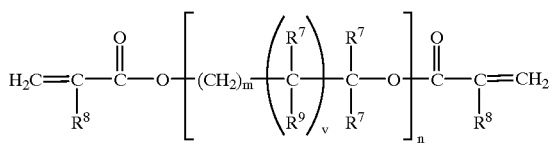

where $R^7$ may be selected from hydrogen, alkyl of 1 to about 4 carbon atoms, hydroxyalkyl of 1 to about 4 carbon atoms or

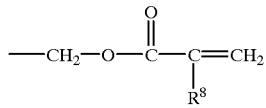

$R^8$ may be selected from hydrogen, halogen, and alkyl of 1 to about 4 carbon atoms;

$R^9$ may be selected from hydrogen, hydroxy and

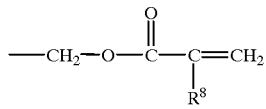

m is an integer equal to at least 1, e.g., from 1 to about 8 or higher, for instance, from 1 to about 4;

n is an integer equal to at least 1, e.g., 1 to about 20 or more; and v is 0 or 1.

Of course, combinations of these (meth)acrylates may also be used as a reactive diluent.

When present, the reactive diluent may be used in an amount within the range of about 0.01 to about 30, such as about 0.05 to about 10 weight percent.

The compositions of the invention may also include other ingredients to modify the cured or uncured properties as desired for specific applications. For instance, adhesion promoters, such as (meth)acryloxypropyltrimethoxysilane, trialkyl- or triallyl-isocyanurate, glycidoxypropyl trimethoxysilane, vinyl trimethoxysilane and the like, may be incorporated at levels up to about 5 weight percent. Other optional ingredients are non-(meth)acrylic silicone diluents or plasticizers at levels of up to about 30 weight percent. The non-(meth)acrylic silicones include trimethylsilyl-terminated oils of 100–500 csp viscosity and silicone gums. The non-(meth)acrylic silicones may include cocurable groups such as vinyl groups.

A desirable method of obtaining (meth)acrylated silicones is reacting a mixture of triethylamine and silanol-terminated silicones, such as polydimethyl siloxane, with dimethylchloro(meth)acryloxypropylsilane, followed by condensation of the resulting aminosilane, yielding dimethyl (meth)acryloxypropylsilyl-terminated silicones, such as dimethyl(meth)acryloxypropylsilyl-terminated polydimethyl siloxane.

The silicone oils used in the formulations of the invention are trimethylsilyl-terminated polydimethylsiloxanes having viscosity between about 100 and 5,000 cps. These oils are employed as plasticizers to control the texture and softness of the cured material, and as diluents to adjust the final viscosity of the composition. For electronic potting compositions in which gel-like materials are desired, the plasticizing silicone oil should be present in the range of about 30–70 weight percent of the composition. Lower amounts of silicone oil produce compositions that yield soft rubbery materials. Amounts of silicone oil in excess of about 70 weight percent produce materials, which will flow even after curing.

In electronic applications, ion trapping compounds such as crown ethers and cryptates may be useful for reducing ionic conductivity, examples of which include 18-crown-6, 12-crown-4 and 15-crown-5. See also U.S. Pat. No. 4,271,425, where the use of crown ethers in conventional RTV silicone encapsulants is described.

The physical characteristics of cured reaction products obtained from a given silicone-based composition will depend on the molecular weight of the reactive silicone of formula (I) as well as on the method of cure employed and the amount of oil. In general, a higher molecular weight of the reactive silicone, should yield a softer cured reaction product.

It should be understood that while the photoinitiator is generally used as a separate component, the inventive compositions are intended to include those in which photoinitiating groups are present in the backbone of the same organopolysiloxane polymer, which includes the photocurable groups.

This invention also provides a process for preparing a composition, the steps of which include providing and mixing together the components noted above.

Once prepared, the inventive silicone compositions may be used through application to a desired substrate. For instance, the inventive compositions may be applied to a desired substrate by a brush, dip or spray method, or by a pressure-time dispense method, as are well-known in the silicone art. The substrates onto which the compositions may be applied include a variety of materials, such as glass, metal or plastic, particularly when the compositions are to be used in electronic applications.

After the application is complete, exposure to radiation in the UV region of the electromagnetic spectrum should provide the means for curing to occur.

UV radiation sources useful to cure the compositions into cured reaction products include conventional mercury-vapor lamps designed to emit ultraviolet energy in various ultraviolet wavelength bands. For example, useful UV radiation wavelength ranges include 220 to 400 nm.

In electronic applications, it is not uncommon for elevated temperatures to be reached, particularly in localized regions within the device on which the composition has been applied and cured. Such an environment is commonly present during the operation of a crt monitor, such as a television.

Accordingly, the present invention was achieved with particular attention to reducing the flammability or combustibility of the cured reaction product, particularly in the environment in which it is intended to be used.

A standard test for measuring flammability and/or combustibility is known as Underwriters Laboratories UL94, "Test for Flammability of Plastic Materials—UL-94" (Jul. 29, 1997), the disclosure of which is hereby expressly incorporated herein by reference. In this test, the materials are classified as V-0, V-1, or V-2 depending on the flame-retardant performance.

Particularly desirable materials in accordance with this invention should reach a V-0 classification, although certain formulations may be classified at a lower level (such as V-1), depending on the end use for which the material is intended. Details of this test and the performance of cured reaction products within the scope of the invention under test conditions are provided below in the examples.

It can be seen that many compositions within the scope of the present invention may be formulated to produce a range of cured properties typical of silicone rubbers. These materials find a variety of uses including coating, sealing and potting electronic components in assemblies or devices, which when used in their intended manner are often exposed conditions of elevated temperatures. Under such conditions, products and reaction products of known silicone compositions may ignite or combust, thereby damaging the electronic component, or the assembly or device in which it is used, as well as the surrounding environment and possibly the end user. The present invention addresses such a circumstance.

The following examples are illustrative of the invention.

EXAMPLES

Example 1

An acrylate-terminated polydimethylsiloxane having a weight average molecular weight of about 12,000 was prepared by reacting about 100 grams of a hydroxyl-terminated polydimethylsiloxane (commercially available under the trade designation MASIL SFR 750, from Bayer Chemicals) with about 4.1 grams of dimethylchloromethacryloxypropylsilane along with triethylamine at a temperature of about 70° C. to about 100° C. for a time period of about 4 to about 6 hours. After this time period, the reaction mixture was filtered to remove triethylamine hydrochloride and transferred to a container for storage.

The acrylate-terminated polydimethylsiloxane reaction product (92.69 weight percent) prepared above was mixed with an inorganic filler component (5.3 weight percent of a hydrophobic fumed silica, commercially available from Wacker Chemie, Adrian, Mich. under the trade designation HDK-2000), the photoinitiator (1.5 weight percent of DEAP, commercially available from First Chemical), the organometallic flame retardant component (0.004 weight percent of the platinum-siloxane complex, BAYSILONE U catalyst Pt/L), and the triazole component (0.5 weight percent of benzotriazole, commercially available from Aldrich Chemical Co.).

Example 2

The acrylate-terminated polydimethylsiloxane prepared as above was used in an amount of 50.46 weight percent, and to which was admixed an inorganic filler component (4.22 weight percent of a hydrophobic fumed silica, commercially available from Wacker Chemie, Adrian, Mich. under the trade designation HDK-2000), the photoinitiator (0.25 weight percent of DEAP, commercially available from First Chemical), the flame-retardant component (0.64 weight percent of the platinum-siloxane complex, BAYSILONE U catalyst Pt/L, and 23.93 weight percent of hydrated alumina), a reactive diluent component (20 weight percent of a methacrylate-terminated-dimethoxypropyldimethyl siloxane), and an adhesion promoter component [0.5 weight percent of an epoxy silane (glycidoxypropyl trimethoxysilane), commercially available from Sivento].

Example 3

The compositions prepared in Examples 1 and 2 were cured by exposure to UV radiation for 18 seconds at an intensity of approximately 70 milliwatts per cm$^2$, after which time rubbery solids were observed to form.

These materials were subjected to a durometer test to measure its hardness and determined to have a 30 Shore A and 74 Shore OO value, respectively.

The composition of Example 2 had a UV depth of cure of 3.5 mm and its surface tackiness was less than the cured composition of Example 1.

Example 4

In this example, a flame-retardant UV/moisture cure composition was prepared based on dimethoxymethacryloxypropyl-terminated polydimethylsiloxane in an amount of 41.96 weight percent, and to which was admixed an inorganic filler component (5.29 weight percent of a hydrophobic fumed silica, commercially available from Wacker Chemie, Adrian, Mich. under the trade designation HDK-2000), an adhesion promoter component [0.5 weight percent of an epoxy silane (glycidoxypropyl trimethoxysilane), commercially available from Sivento], and the flame retardant component (0.4 weight percent of the platinum-siloxane complex, BAYSILONE U catalyst Pt/L and 50 weight percent of hydrated alumina). In addition, a photoinitiator (1.5 weight percent of DEAP), and a moisture cure catalyst (0.3 weight percent of tetraisopropoxytitanate) were included in this composition.

Example 5

The composition of Example 4 was dispensed onto a glass slide and cured by exposure to 100 mW/cm$^2$ for about 60 seconds to each side of the slide. The UV-cured composition was then allowed to cure by exposure to atmospheric moisture for a period of about three days.

Example 6

In this example, a series of compositions were prepared to evaluate certain physical properties in the uncured and cured state. The compositions were based on a pre-mix of the acrylate-terminated polydimethylsiloxane prepared as above used in an amount of 42.26 weight percent, and to which was admixed an inorganic filler component (5.29 weight percent of a hydrophobic fumed silica, commercially available from Wacker Chemie, Adrian, Mich. under the trade designation HDK-2000), an adhesion promoter component [0.5 weight percent of an epoxy silane (glycidoxypropyl trimethoxysilane), commercially available from Sivento], and the flame retardant component (0.4 weight percent of the platinum-siloxane complex, BAYSILONE U catalyst Pt/L and 50 weight percent of hydrated alumina).

To the pre-mix identified above was added the photoinitiator (0.2 weight percent of DAROCUR 4265, commercially available from Ciba Specialty Chemicals Corporation), and a reactive diluent component in an an amount from 0.5 to 10 weight percent (isobornyl acrylate). More specifically, the compositions of this example are identified as 6-1 (0.5 weight percent isobornyl acrylate), 6-2 (1 weight percent), 6-3 (5 weight percent), 6-4 (10 weight percent), 6-5 (6 weight percent), 6-6 (7 weight percent) and 6-7 (8 weight percent). Composition 6-0 is a control to which no reactive diluent has been added. The physical properties measured—depth of cure, viscosity (cone and plate viscometer/spindle cp 52 @10 rpm), and tack—are set forth below in the table.

| Sample No. | Depth of Cure (mm) | Viscosity (cps) | Tack |
|---|---|---|---|
| 6-0 | 2.0 | 20,000 | Tacky |
| 6-1 | 2.04 | 19267.5 | Slight |
| 6-2 | 2.0 | 17301.5 | Slight (surface cure <8 hrs) |
| 6-3 | 2.1 | 11403.2 | Slight (surface cure <8 hrs) |
| 6-4 | 2.35 | 3342.3 | Slight (surface cure ~4 hrs) |
| 6-5 | 2.2 | 9830.3 | Slight (surface cure <8 hrs) |
| 6-6 | 2.3 | 8454.0 | Slight (surface cure ~4 hrs) |
| 6-7 | 1.8 | 7864.3 | Slight (surface cure ~4 hrs) |

A depth of cure greater than 1 mm is desirable as it imparts a greater level of environmental protection (against dust, moisture and abrasion) than thinner films or encapsulants. A depth of cure greater than 1 mm also provides added assurance that the components, which are sealed by the cured composition should not move. Viscosities of less than about 20,000 cps are desirable as they enhance the dispensability of the composition. Low tack is desirable as it inhibits dust accumulation, and allows for easier handling of the parts after cure. Thus, a combination of these properties, offering enhanced depth of cure, easy dispensability, and rapid surface cure, in combination with a V-0 rating (see below) is particularly desirable.

Example 7

According to the UL-94 test method, the compositions prepared in accordance with Examples 1, 2, 4 and 6 were dispensed into molds and cured as in Example 3 into test pieces of the following dimensions: 125±5 mm by 13±5 mm.

Five test pieces are arranged such that the middle of a flame may contact the middle portion of the test piece. The flame is maintained in such position relative to the test piece for a period of 10±0.5 seconds. The amount of time the test piece continues to flame after removal of the flame is termed the afterflame time.

Once the test piece stops afterflaming, the flame is positioned toward the same portion of the test piece for an additional period of time of 10±0.5 seconds. After this time period, the flame is removed and this second afterflame time is measured. The afterglow time is also measured thereafter. After each flame application, five results are measured for the test pieces: (1) the first afterflame time; (2) the second afterflame time; (3) the afterglow time after the second afterflamming; (4) whether the test pieces burn to the clamps; and (5) whether the test pieces drip flaming particles.

From these results, criteria conditions may be measured to determine whether the sample meets a V-0 designation. The criteria conditions are set forth below:

| Criteria Conditions | V-0 | V-1 | V-2 |
|---|---|---|---|
| Afterflame time (first or second) | ≦10 secs | ≦30 secs | ≦30 secs |
| Total afterflame time for any condition set | ≦50 secs | ≦250 secs | ≦250 secs |

-continued

| Criteria Conditions | V-0 | V-1 | V-2 |
|---|---|---|---|
| Afterflame plus afterglow time for each individual specimen after the second flame application | ≦30 secs | ≦60 secs | ≦60 secs |
| Afterflame or afterglow of any specimen up to the holding clamp | No | No | No |
| Cotton indicator ignited by flaming particles or drops | No | No | No |

The composition from Example 1 performed well in accordance with these criteria conditions, and established a V-0 rating. Its values were: <6 secs, 8 secs, 0 secs, No, and No. The composition from Example 2 performed well in accordance with these criteria conditions, and established a V-2 rating. Its values, taken as an average of five, were: 17 secs and 37 secs. The remaining three measurements were not observed.

As to the composition of Example 4, after dispensing the composition to a film of about 3 mm and an initial exposure to 100 mW/cm² for 60 seconds on each side of the glass side, the surface of the composition had cured tack free, but the interior had not cured completely. After allowing the composition to moisture cure for a period of about 24 hours, the depth of cure appeared to be good. However, a flammability evaluation pursuant to UL-94 revealed the cured composition to burn slightly. A separate sample of the composition was allowed to continue to moisture cure for an additional period of 48 hours, at which point a flammability evaluation pursuant to UL-94 revealed that the so-cured composition established a V-0 rating.

Certain of the compositions of Example 6 (6-1, 6-2, 6-3 and 6-5) established a V-0 rating, whereas others (6-4, 6-6 and 6-7) established a V-1 rating.

Among other commercial applications, the compositions of this invention may be used in the assembly and manufacture of consumer electronic devices to overcoat electrical connections.

It will be clear to those of skill in the art that variations of the invention as described exist, and such variations are within from the spirit and scope of the invention. Accordingly all such variations are intended to be included within the scope of the claims.

What is claimed is:

1. A silicone composition curable by UV irradiation and exposure to moisture to an elastomer, which is resistant to flammability, comprising:

(a) a reactive silicone resin component comprising a reactive polyorganosiloxane within the formula:

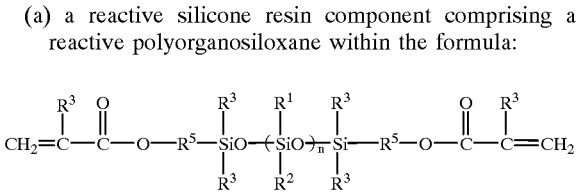

wherein $R^1$, $R^2$ and $R^3$ may be the same or different and are organo groups selected from the group consisting of alkyl, halo alkyls, substituted or unsubstituted aryl, alkoxy, substituted or unsubstituted aryloxy, vinyl, methacryloxypropyl, mercaptopropyl, hydrogen and benzoin; $R^4$ is H or $C_{1-5}$ alkyl; $R^5$ is $C_{1-8}$ alkylene; and n is at least 80

(b) optionally, an inorganic filler component;
(c) a photoinitiator component;
(d) a flame-retardant component in an amount effective to enhance the resistance of said composition to flammability, wherein the flame-retardant component is the combination of hydrated alumina and a member selected from the group consisting of organo ligand complexes of transition metals, organosiloxane ligand complexes of transition metals, and combinations thereof; and
(e) a moisture cure catalyst.

2. The composition according to claim 1, further comprising a triazole component.

3. The composition according to claim 2, wherein the triazole component is a member selected from the group consisting of benzotriazole and derivatives thereof.

4. The composition according to claim 1, further comprising a reactive diluent component.

5. The composition according to claim 4, wherein the reactive diluent is (meth)acrylate-terminated-dimethoxypropyldimethyl siloxane.

6. The composition according to claim 4, wherein the reactive diluent is within the formula, $H_2C=CGCO_2R^6$, wherein G may be hydrogen, halogen or alkyl of 1 to about 4 carbon atoms, and $R^6$ may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulonate, and sulfone.

7. The composition according to claim 4, wherein the reactive diluent is a (meth)acrylate selected from the group consisting of polyethylene glycol di(meth)acrylates, bisphenol-A di(meth)acrylates, tetrahydrofuran (meth)acrylates and di(meth)acrylates, citronellyl acrylate and citronellyl methacrylate, hydroxypropyl (meth)acrylate, hexanediol di(meth)acrylate, trimethylol propane tri(meth)acrylate, tetrahydrodicyclopentadienyl (meth)acrylate, ethoxylated trimethylol propane triacrylate, triethylene glycol diacrylate, triethylene glycol dimethacrylate, isobornyl acrylate, isobornyl methacrylate, and an acrylate ester corresponding to structure III as shown below:

III

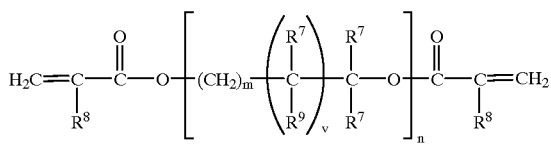

wherein $R^7$ may be selected from hydrogen, alkyl of 1 to about 4 carbon atoms, hydroxyalkyl of 1 to about 4 carbon atoms or

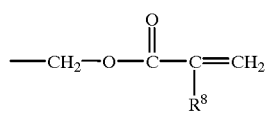

$R^8$ may be selected from hydrogen, halogen, and alkyl of 1 to about 4 carbon atoms;

$R^9$ may be selected from hydrogen, hydroxy and

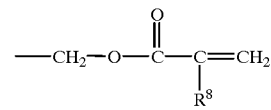

m is an integer equal to at least 1, e.g., from 1 to about 8 or higher, for instance, from 1 to about 4;

n is an integer equal to at least 1, e.g., 1 to about 20 or more; and v is 0 or 1.

8. The composition according to claim 4, wherein the reactive diluent is isobornyl acrylate.

9. The composition according to claim 1, wherein the inorganic filler component is a fumed hydrophobic silica filler.

10. The composition according to claim 9, wherein the fumed silica filler is a member selected from the group consisting of dimethyldichlorosilane-treated silica, hexamethyldisilazane-treated silica, and combinations thereof.

11. The composition according to claim 9, wherein the fumed silica filler is present at a level in range of about 4 to about 10 weight percent.

12. The composition according to claim 1, wherein the transition metals are selected from the group consisting of platinum, ruthenium, rhodium, and palladium.

13. The composition according to claim 1, wherein the photoinitiator component is a member selected from the group consisting of benzoin and substituted benzoins, Michler's ketone, benzophenone and substituted benzophenones, acetophenone and substituted acetophenones, xanthone and substituted xanthones, and combinations thereof.

14. The composition according to claim 1, wherein the photoinitiator component is a member selected from the group consisting of 1-hydroxycyclohexyl phenyl ketone, 2-methyl-1-[4-(methylthio)phenyl]-2-morpholino propan-1-one, 2-benzyl-2-N,N-dimethylamino-1-(4-morpholinophenyl)-1-butanone, benzophenone, 2,2-dimethoxy-2-phenyl acetophenone, bis(2,6-dimethoxybenzoyl-2,4-,4-trimethyl pentyl) phosphine oxide, and 2-hydroxy-2-methyl-1-phenyl-propan-1-one, bis(2,4,6-trimethyl benzoyl) phenyl phosphine oxide, 2-hydroxy-2-methyl-1-phenyl-1-propane, 2,4,6-trimethylbenzoyldiphenyl-phosphine oxide, visible light [blue] photoinitiators, dl-camphorquinone, bis($\eta^5$-2,4-cyclopentadien-1-yl)-bis[2,6-difluoro-3-(1H-pyrrol-1-yl) phenyl]titanium, and combinations thereof.

15. The composition according to claim 1, wherein the moisture cure catalyst is selected from the group consisting of compounds of titanium, tin, zirconium and combinations thereof.

16. The composition according to claim 1, further comprising an adhesion promotor.

17. The composition according to claim 16, wherein the adhesion promotor is a member selected from the group consisting of (meth)acryloxypropyltrimethoxysilane, trialkyl- or triallyl-isocyanurate, glycidoxypropyl trimethoxysilane, vinyl trimethoxysilane and combinations thereof.

18. Reaction products of the composition according to claim 1.

19. A process for preparing a composition in accordance with claim 1, the steps of which comprise:

providing and mixing together (a) a reactive silicone resin component comprising a reactive polyorganosiloxane having at least one functional carboxylate group selected from the group consisting of (meth)acrylate, maleate, cinnamate and combinations thereof; (b) an optional, inorganic filler component; (c) a photoinitiator component; (d) a flame-retardant component in an amount effective to enhance the resistance of said composition to flammability, wherein the flame-retardant component is the combination of hydrated alumina and a member selected from the group consisting of organo ligand complexes of transition metals, organosiloxane ligand complexes of transition metals, and combinations thereof; (e) a moisture cure catalyst; and optionally (f) a triazole component; and optionally (g) a reactive diluent component, and optionally (h) an adhesion promoter.

20. The composition according to claim 19, further comprising an adhesion promotor.

* * * * *

UNITED STATES PATENT AND TRADEMARK OFFICE
CERTIFICATE OF CORRECTION

PATENT NO.    : 6,323,253 B1
DATED         : November 27, 2001
INVENTOR(S)   : Lester D. Bennington It is certified that error appears in the above-identified patent and that said Letters Patent is hereby corrected as shown below:

Title page,
Item [57], ABSTRACT,
Line 6, change "components" to -- component --

Column 2,
Line 18, change "ingnition" to -- ignition --

Column 3,
Line 15, before "flame-retardant" delete -- a --

Column 5,
Line 3, after "designation" delete -- . --
Line 22, change "Speciallty" to -- Specialty --

Column 6,
Line 25, change "affect" to -- effect --

Column 9,
Line 6, after "exposed" insert -- to --

Column 10,
Line 56, delete second occurrence of -- an --

Column 11,
Line 54, change "afterflamming" to -- afterflaming --

UNITED STATES PATENT AND TRADEMARK OFFICE
CERTIFICATE OF CORRECTION

PATENT NO.     : 6,323,253 B1
DATED          : November 27, 2001
INVENTOR(S)    : Lester D. Bennington It is certified that error appears in the above-identified patent and that said Letters Patent is hereby corrected as shown below:

Column 12,
Line 45, after "within" delete -- from --

Signed and Sealed this

Twelfth Day of November, 2002

Attest:

Attesting Officer

JAMES E. ROGAN
Director of the United States Patent and Trademark Office